United States Patent
Ohno et al.

(10) Patent No.: US 8,538,470 B2
(45) Date of Patent: Sep. 17, 2013

(54) CALL SERVER, CALL TERMINAL, CALL SYSTEM, TRANSFER PROCESSING METHOD, AND PROGRAM STORAGE MEDIUM STORING PROGRAM THEREOF

(75) Inventors: Takashi Ohno, Kawasaki (JP); Kenichi Horio, Kawasaki (JP); Masahide Noda, Kawasaki (JP); Jun Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1086 days.

(21) Appl. No.: 11/943,160

(22) Filed: Nov. 20, 2007

(65) Prior Publication Data

US 2008/0117834 A1 May 22, 2008

(30) Foreign Application Priority Data

Nov. 20, 2006 (JP) .................................. 2006-313053

(51) Int. Cl.
*H04B 7/00* (2006.01)
(52) U.S. Cl.
USPC ........... 455/518; 455/450; 455/451; 455/519; 455/452.1; 370/315; 370/316; 370/317; 370/318; 370/493
(58) Field of Classification Search
USPC ......... 455/517–520, 450–455; 370/315–318, 370/493–496
See application file for complete search history.

(56) References Cited

U.S. PATENT DOCUMENTS

| | | | | |
|---|---|---|---|---|
| 7,496,366 | B2 * | 2/2009 | Harris | 455/452.2 |
| 2006/0013130 | A1 * | 1/2006 | Bloebaum | 370/229 |
| 2006/0251180 | A1 * | 11/2006 | Baum et al. | 375/260 |

FOREIGN PATENT DOCUMENTS

| | | |
|---|---|---|
| CN | 1592276 A | 3/2005 |
| EP | 1513304 A2 | 3/2005 |
| EP | 1545085 A1 | 6/2005 |
| JP | 09331356 A * | 12/1997 |
| JP | 2000151637 A | 5/2000 |
| JP | 2005-252665 A | 9/2005 |
| JP | 2006135500 A | 5/2006 |
| JP | 2007-503766 A | 2/2007 |
| JP | 2007-534225 A | 11/2007 |
| WO | WO 2004/075581 A1 | 9/2004 |
| WO | 2005/020598 A2 | 3/2005 |
| WO | 2005/051016 A1 | 6/2005 |
| WO | WO 2006/025789 A1 | 3/2006 |

OTHER PUBLICATIONS

European Search Report dated Feb. 29, 2008, issued in corresponding European Patent Application No. 07117833.

(Continued)

*Primary Examiner* — Fayyaz Alam
(74) *Attorney, Agent, or Firm* — Westerman, Hattori, Daniels & Adrian, LLP

(57) ABSTRACT

A reception-process manager of a call server writes, in a transfer-voice-data storage, voice data contained in a voice packet received from the transmitter terminal which has acquired the talk right. A transmission-process manager of the call server determines the next transmission interval of a voice packet for each receiver terminal on the basis of determination information received from the each receiver terminal. The transmission-process manager reads out the voice data in a size dependent on the determined transmission interval from the transfer-voice-data storage, generates voice packet containing the voice data for the each receiver terminal, and transmits the voice packet to the each receiver terminal. Thus, the voice-packet transmission interval can be changed for each receiver terminal without stopping voice-packet transmission.

9 Claims, 13 Drawing Sheets

(56) References Cited

OTHER PUBLICATIONS

Chinese Office Action dated Apr. 29, 2010, issued in corresponding Chinese Patent Application No. 200710167559.3.

"RTP: A Transport Protocol for Real-Time Applications: URL:http://www.ietf.org/rfc1889.Txt?number=1889".

Japanese Office Action dated Nov. 30, 2010, issued in corresponding Japanese Patent Application No. 2006-313053.

* cited by examiner

| CALL TERMINAL ~52 | TRANSMISSION INTERVAL ~54 |
|---|---|
| A | 80ms |
| B | 40ms |
| C | 60ms |

FIG. 9

PACKET-LOSS RATE = THE NUMBER OF LOST PACKETS / (MAX. SEQ. No. − MIN. SEQ. No. + 1)

$JITTER_m = JITTER_{m-1} + (|(TR_m - TS_m) - (TR_{m-1} - TS_{m-1})| - JITTER_{m-1}) / 16$ n: SEQUENCE No.

m: RECEPTION ORDER

CALL SERVER, CALL TERMINAL, CALL SYSTEM, TRANSFER PROCESSING METHOD, AND PROGRAM STORAGE MEDIUM STORING PROGRAM THEREOF

This application claims the benefit of priority of Japanese Patent Application No. 2006-31305 filed Nov. 20, 2006.

BACKGROUND OF THE INVENTION

1. Field of the Invention

The present invention relates to a system for providing voice sessions, in particular, to a method for providing voice sessions with a good voice quality in voice sessions between three or more parties.

2. Description of the Related Art

A new communication service called PoC (Push-to-Talk over Cellular) has been attracting attention. The PoC is also referred to as PoC/W (Push-to-Talk over Cellular/Wireless), and is a transceiver-type voice session service that allows two-way conversation Unlike conventional IP (Internet Protocol) phone services, such as a VoIP (Voice over Internet Protocol) service, the PoC has features that the PoC allows a voice packet to be simultaneously transmitted to a plurality of recipients (PoC clients), and allows the recipients to receive voice messages without performing any actions for answering. Due to these features, the PoC service has been attracting interests in numerous fields as an easy communication tool among a group. Users push a talk button provided on PoC clients, thereby acquiring permission to talk (a talk right) from a PoC server, and talking. Only one client in the group can acquire the talk right from the PoC server at a time. PoC clients perform communication with each other while repeating acquisition and release of the talk right.

Call terminals that receive a voice packet, which is a unit of transmission of voice information, convert voice data contained in the voice packet into a voice signal, and output the reproduced voice sound from a loudspeaker. In case that the following voice packet does not arrive even after finishing the output of the reproduced voice sound, a pause is caused after the reproduced voice sound. As jitter in packet transmission time is caused due to a condition of the network, such pauses frequently appear if voice sound is immediately reproduced from the received voice packets. That is, such quality degradation occurs that the reproduced voice sound frequently breaks. To avoid this, reproduction of voice sound is not performed immediately after receiving the voice packets. Instead, the voice data is accumulated in a buffer, and after some delay, reproduction of voice sound is started. By this, although breaks in voice sound become less, the time to the start of reproduction is delayed. Since the jitter in the packet transmission time is great in a mobile network, it is necessary to provide a large-capacity buffer and to delay the start of reproduction significantly in order to perform high-quality voice-packet transmission. Large time delay to the start of reproduction cannot be set in IP phones, which requires short voice delay. Thus, it is difficult to introduce IP phones into a mobile network. However, the PoC can permit larger voice delay compared with the IP phones because full duplex voice-packet transmission is not performed in the PoC, and can set a large time delay to the start of reproduction. Accordingly, introduction of the PoC is easy even on a mobile network. Voice-packet transmission in the PoC is performed in accordance with a specification defined in RFC (Request for Comments) 1889 of IETF (Internet Engineering Task Force) (H. Schulzrinne and three others, "RTP: A Transport Protocol for Real-Time Applications", January 1996, Internet Engineering Task Force).

SUMMARY OF THE INVENTION

When real-time voice-packet transmission is performed via a mobile network, shortening of the voice-packet transmission interval makes the packet transmission frequency higher, whereas extension of the voice-packet transmission interval makes the packet length longer. In either case, it is known that the voice quality deteriorates if the shortening or the extension becomes extreme. Accordingly, to obtain better voice quality, it is necessary to set an appropriate voice-packet transmission interval. However, the appropriate voice-packet transmission interval momentarily changes depending on factors, such as differences in network characteristics of network systems provided by carriers, differences in transmission directions (uplink/downlink), radio wave conditions, and a degree of congestion. For this reason, better voice quality can be obtained in a case where the voice-packet transmission interval is adjusted in accordance with the circumstance at that time than in a case where the voice-packet transmission interval is kept constant.

In case of one-to-one call, it is possible to change the voice-packet transmission interval during communication by performing negotiation between both parties. At that time, the voice-packet transmission may be stopped if necessary. When one-to-multiple transmission, such as PoC, is performed, the voice-packet transmission interval that is better for a specific call terminal is not necessarily better for other call terminals, since the reception environment of each receiver terminal differs. Accordingly, it is desirable to adjust the voice-packet transmission interval for each receiver terminal. At this time, since other receiver terminals are receiving voice packets, it is desired to avoid stopping all of voice-packet transmission for a specific receiver terminal.

It is an object of the present invention to provide a call system that allows the voice-packet transmission interval to be changed for each receiver terminal without stopping voice-packet transmission.

One aspect of the present invention provides a server which is capable of communicating with a plurality of terminals. The server includes a reception manager and a transmission manager. The reception manager includes a packet receiver which receives from a first terminal a first sequence of packets which contains communication data. The transmission manager includes a packet generator and a packet transmitter. The packet generator generates a second sequence of packets for each of a plurality of second terminals which are connected to the server on the basis of a second transmission interval which is determined for the each second terminal, wherein the second sequence of packets contains the communication data. The packet transmitter transmits the each second sequence of packets at corresponding second transmission interval.

The transmission manager of the server may further include a determination-information receiver and an interval determiner. The determination-information receiver receives determination information from the each second terminal. The interval determiner determines the second transmission interval on the basis of the determination information. The packet generator generates the second sequence of packets on the basis of the second transmission interval which is determined by the interval determiner and the communication data.

In the server, the determination information may contain interval specification information which specifies an updated value of the second transmission interval. In this configuration, the interval determiner updates the second transmission interval in accordance with the updated value.

In the server, the determination information may contain interval change information which specifies an increase or a decrease in the second transmission interval. In this configuration, the interval determiner updates the second transmission interval, on the basis of the interval change information.

The server may further include a quality-information storage which stores quality information which indicates quality of communication and the determination information may contain the quality information. In this configuration, the interval determiner updates the second transmission interval on the basis of the quality information which is stored in the quality-information storage and the quality information which is contained in the determination information received by the determination-information receiver, and a current second transmission interval. The quality information which is contained in the determination information which is received from the second terminal is stored in the quality-information storage after the update of the second transmission interval.

The reception manager of the server may further include a determination-information transmitter which transmits determination information to the first terminal, wherein the determination information is generated on the basis of the first sequence of packets in order to determine a first transmission interval. The first terminal transmits the first sequence of packets at the first transmission interval.

The reception manager of the server may further include a quality evaluator which evaluates quality of communication at a time of receiving the first sequence of packets, and generates quality information which indicates the quality of communication. In this configuration, the determination information contains the quality information.

The server may further include a quality-information storage which stores quality information which indicates quality of communication at a time of receiving the first sequence of packets. The reception manager of the server may further include a quality evaluator and a change determiner. The quality evaluator evaluates the quality of communication and generates the quality information. The change determiner generates interval change information by comparing the quality information which is stored in the quality-information storage with the quality information which is generated by the quality evaluator, wherein the interval change information specifies an increase or a decrease in the first transmission interval. The quality information which is generated by the quality evaluator is stored in the quality-information storage after the comparison. In this configuration, the determination information contains the interval change information.

The server may further include a quality-information storage which stores quality information which indicates quality of communication at a time of receiving the first sequence of packets. The reception manager of the server may further include a quality evaluator, a change determiner, an interval calculator, and an interval specification generator. The quality evaluator evaluates the quality of communication and generates the quality information. The change determiner generates interval change information by comparing the quality information which is stored in the quality-information storage with the quality information which is generated by the quality evaluator wherein the interval change information specifies an increase or a decrease in the first transmission interval, and the quality information which is generated by the quality evaluator is stored in the quality-information storage after the comparison. The interval calculator calculates the first transmission interval at the time of receiving the first sequence of packets. The interval specification generator generates interval specification information on the basis of the interval change information and the first transmission interval which is calculated by the interval calculator, wherein the interval specification information specifies an updated value of the first transmission interval. In this configuration, the determination information contains the interval specification information.

Another aspect of the present invention provides a terminal which is capable of communicating with a server. The terminal includes an input unit, a determination-information receiver, an interval determiner, a packet generator, and a packet transmitter. The input unit receives an input signal which is input by a user and converts the input signal into communication data. The determination-information receiver receives determination information from the server. The interval determiner determines a transmission interval on the basis of the determination information. The packet generator generates a sequence of packets on the basis of the communication data and the transmission interval. The packet transmitter transmits the sequence of packets to the server at the transmission interval.

In the terminal, the determination information may contain interval specification information which specifies an updated value of the transmission interval. In this configuration, the interval determiner updates the transmission interval in accordance with the updated value.

In the terminal, the determination information may contain interval change information which specifies an increase or a decrease in the transmission interval. In this configuration, the interval determiner updates the transmission interval on the basis of the interval change information and a current transmission interval.

The terminal may further include a quality-information storage which stores quality information which indicates quality of communication. The determination information may contain the quality information. The interval determiner may update the transmission interval on the basis of the quality information which is stored in the quality-information storage and the quality information which is contained in the determination information which is received by the determination-information receiver and a current transmission interval. The quality information which is contained in the determination information which is received from the server is stored in the quality-information storage after the update of the transmission interval.

Another aspect of the present invention provides another terminal which is capable of communicating with a server. The another terminal includes a communication-information receiver, an output unit, and a determination-information transmitter. The communication-information receiver receives a sequence of packets from the server, wherein the sequence of packets contains communication data. The output unit converts the communication data into an output signal and outputs the output signal. The determination-information transmitter transmits determination information to the server, wherein the determination information is generated on the basis of the sequence of packets in order to determine a transmission interval, and the server transmits the sequence of packets at the transmission interval.

The another terminal may further include a quality evaluator. The quality evaluator evaluates quality of communication at a time of receiving the sequence of packets and generates quality information which indicates the quality of communication. In this configuration, the determination information contains the quality information.

The another terminal may further include a quality evaluator, a quality-information storage, and a change determiner. The quality evaluator evaluates quality of communication at a time of receiving the sequence of packets and generates quality information which indicates the quality of communication. The quality-information storage stores the quality information. The change determiner generates interval change information by comparing the quality information which is stored in the quality-information storage with the quality information which is generated by the quality evaluator, wherein the interval change information specifies an increase or a decrease in the transmission interval, and the quality information which is generated by the quality evaluator is stored in the quality-information storage after the comparison. In this configuration, the determination information contains the interval change information.

The another terminal may further include a quality evaluator, a quality-information storage, a change determiner, an interval calculator, and an interval specification generator. The quality evaluator evaluates quality of communication at a time of receiving the sequence of packets and generates quality information which indicates the quality of communication. The quality-information storage stores the quality information. The change determiner generates interval change information by comparing the quality information which is stored in the quality-information storage with the quality information which is generated by the quality evaluator, wherein the interval change information specifies an increase or a decrease in the transmission interval and the quality information which is generated by the quality evaluator is stored in the quality-information storage after the comparison. The interval calculator calculates the transmission interval at the time of receiving the sequence of packets. The interval specification generator generates interval specification information on the basis of the interval change information and the transmission interval which is calculated by the interval calculator, wherein the interval specification information specifies an updated value of the transmission interval. In this configuration, the determination information contains the interval specification information.

Another aspect of the present invention provides a yet another terminal which is capable of communicating with a server. The server receives a first sequence of packets from a transmitter terminal, wherein the first sequence of packets contains first communication data. The server transmits a second sequence of packets to a receiver terminal, wherein the second sequence of packets contains the first communication data. The yet another terminal includes a transmitter part and a receiver part. The transmitter part serves as the transmitter terminal and includes an input unit, a determination-information receiver, an interval determiner, a packet generator, and a packet transmitter. The input unit receives an input signal which is input by a user and converts the input signal into the first communication data. The determination-information receiver receives first determination information from the server. The interval determiner determines a first transmission interval on the basis of the first determination information. The packet generator generates the first sequence of packets on the basis of the first communication data and the first transmission interval. The packet transmitter transmits the first sequence of packets to the server at the first transmission interval. The receiver part serves as the receiver terminal and includes a communication-information receiver, an output unit, and a determination-information transmitter. The communication-information receiver receives the second sequence of packets from the server, wherein the second sequence of packets contains second communication data. The output unit converts the second communication data into an output signal and outputs the output signal. The determination-information transmitter transmits second determination information to the server, wherein the second determination information is generated on the basis of the second sequence of packets in order to determine a second transmission interval, and the server transmits the second sequence of packets at the second transmission interval.

Still another aspect of the present invention provides a program storage medium which is readable by a computer. The program storage medium stores a program of instructions for the computer to execute a transfer processing method. The computer is capable of communicating with a plurality of terminals and includes an interval-information storage for storing a second transmission interval which is determined for each terminal. The transfer processing method includes the steps of: receiving a first sequence of packets from a first terminal, wherein the first sequence of packets contains communication data; calculating a first transmission interval of the first sequence of packets; transmitting the first sequence of packets to a same-interval terminal at the first transmission interval after rewriting a destination address of the first sequence of packets, wherein the same-interval terminal is other than the first terminal, the second transmission interval which is determined for the same-interval terminal coincides with the first transmission interval, and the destination address is an address of the same-interval terminal; extracting the communication data from the first sequence of packets; generating a second sequence of packets on the basis of the communication data and the second transmission interval for a different-interval terminal, wherein the different-interval terminal is other than the first terminal, the second transmission interval which is determined for the different-interval terminal is different from the first transmission interval; and transmitting to the different-interval terminal the second sequence of packets which is generated for the different-interval terminal at the second transmission interval which is determined for the different-interval terminal.

According to the present invention, in a PoC system in which three or more parties attend and perform a voice session, it is possible to adjust a voice-packet transmission interval for each receiver terminal without stopping transmission of the voice packet Thus, it is possible to obtain better voice quality by setting the voice-packet transmission interval corresponding to a reception environment for each receiver terminal.

BRIEF DESCRIPTION OF THE DRAWINGS

FIG. 9 is a diagram showing a data structure of the interval information to be stored in the interval-information storage according to the embodiment of the present invention;

DESCRIPTION OF THE PREFERRED EMBODIMENTS

In the following, embodiments of present invention will be described on the basis of the drawings.

Figure 1:
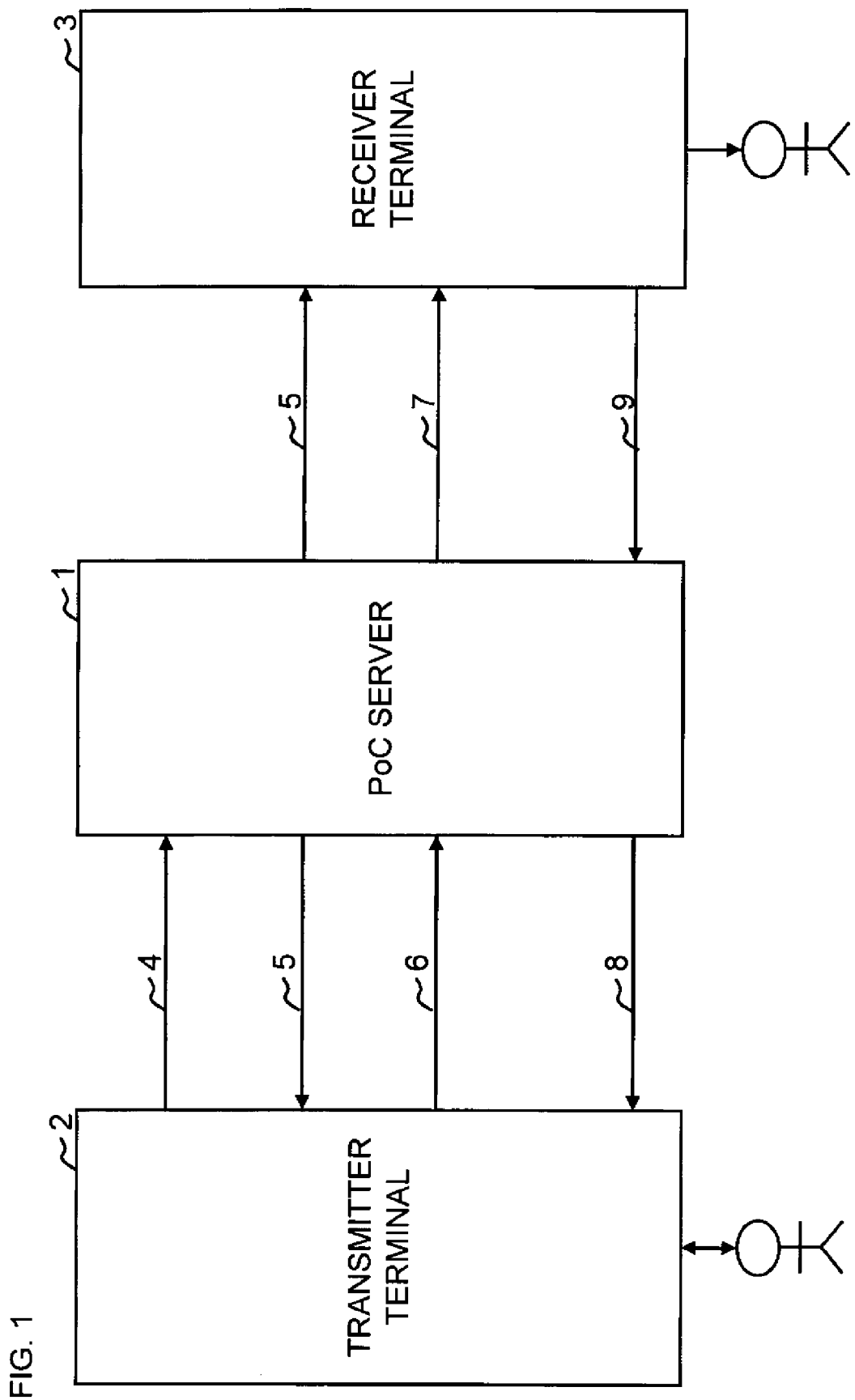
FIG. 1 is a diagram showing a system configuration of a call system according to an embodiment of the present invention.

FIG. 1 is a diagram showing a system configuration of a call system according to an embodiment of the present invention. The call system according to the present embodiment includes a transmitter terminal 2 for transmitting a voice packet 6, a receiver terminal 3 for receiving a voice packet 7, and a PoC server 1 for transferring the voice packet 6 transmitted from the transmitter terminal 2, to the receiver terminal 3. The transmitter terminal 2 transmits a talk-right request 4 to the PoC server 1. The PoC server 1 determines grant of a talk right (floor, right of speaking, voice), and notifies the transmitter terminal 2 and the receiver terminal 3 of talk-right information 5. The transmitter terminal 2 transmits the voice packet 6 to the PoC server 1. The PoC server 1 converts the received voice packet 6 into the voice packet 7, and transmits the voice packet 7 to the receiver terminal 3. The receiver terminal 3 receives the voice packet 7 that is transmitted from the PoC server 1. The PoC server 1 notifies the transmitter terminal 2 of determination information 8 which is information for determining a transmission interval of the voice packet 6. The transmitter terminal 2 determines the next transmission interval of the voice packet 6 on the basis of the determination information 8. The receiver terminal 3 notifies the PoC server 1 of determination information 9 which is information for determining a transmission interval of the voice packet 7. The PoC server 1 determines the next transmission interval of the voice packet 7 on the basis of the determination information 9.

Figure 2:
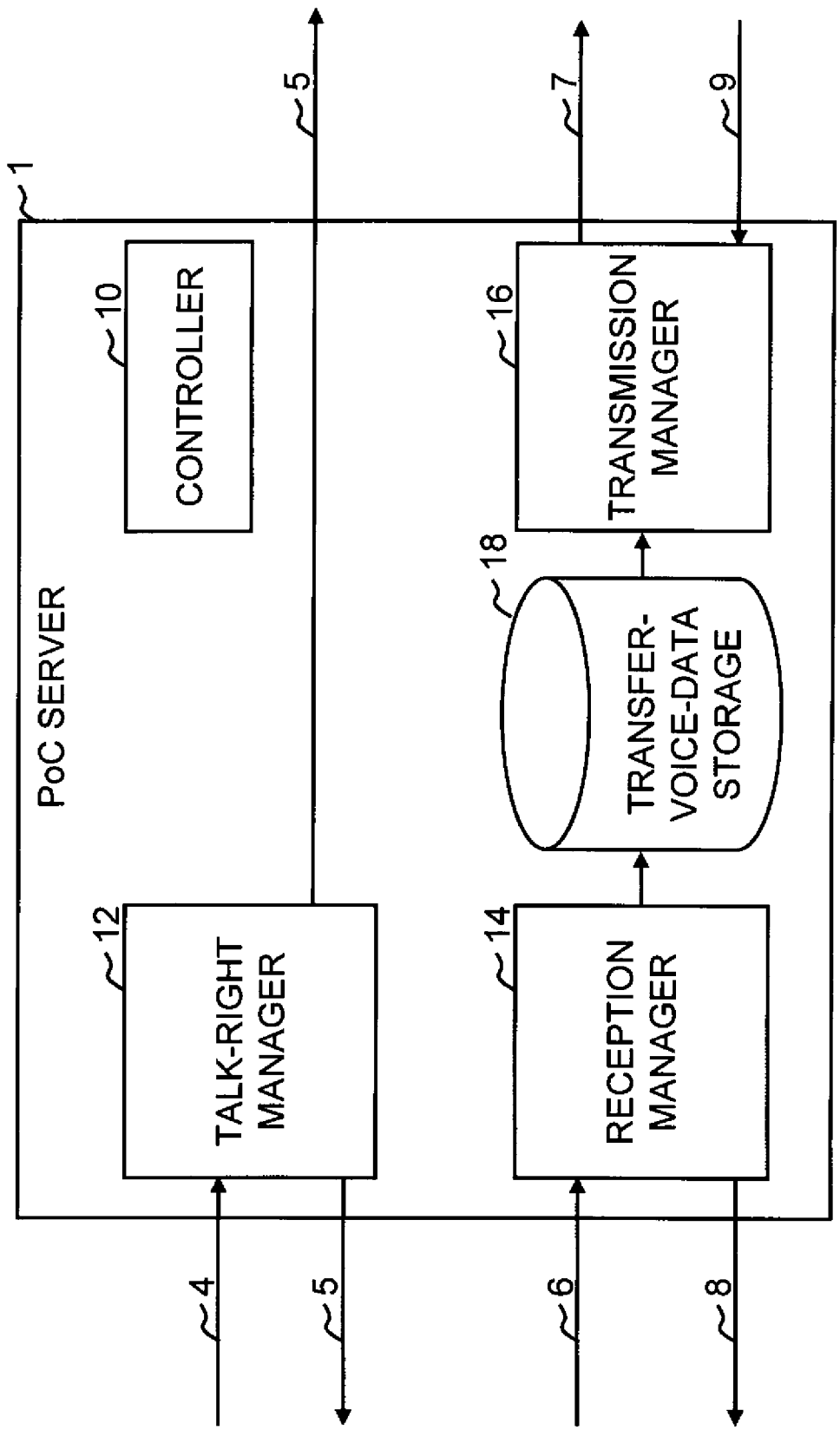
FIG. 2 is a diagram showing a system configuration of the PoC server according to the embodiment of the present invention.

FIG. 2 is a diagram showing a system configuration of the PoC server 1 according to the embodiment of the present invention. The PoC server 1 according to the present embodiment includes a talk-right manager 12 for managing a talk right, a reception-process manager 14 for managing voice-packet reception process, a transmission-process manager 16 for managing voice-packet transmission process, a transfer-voice-data storage 18 for accumulating voice data contained in the received voice packet 6, and a controller 10 for controlling the entire process flow of the PoC server 1. In addition, the controller 10 performs all of functions of a normal PoC server. In response to the talk-right request 4 transmitted from the transmitter terminal 2, the talk-right manager 12 determines grant of a talk right, and notifies the transmitter terminal 2 and the receiver terminal 3 of the talk-right information 5. The reception-process manager 14 writes voice data contained in the received voice packet 6 in the transfer-voice-data storage 18, and notifies the transmitter terminal 2 of the determination information 8. The transmission-process manager 16 determines the next transmission interval of the voice packet 7 on the basis of the determination information 9 notified by the receiver terminal 3, reads out the voice data in a size dependent on the determined transmission interval from the transfer-voice-data storage 18, generates the voice packet 7 that contains the read out voice data, and transmits the voice packet 7 to the receiver terminal 3.

Figure 3:
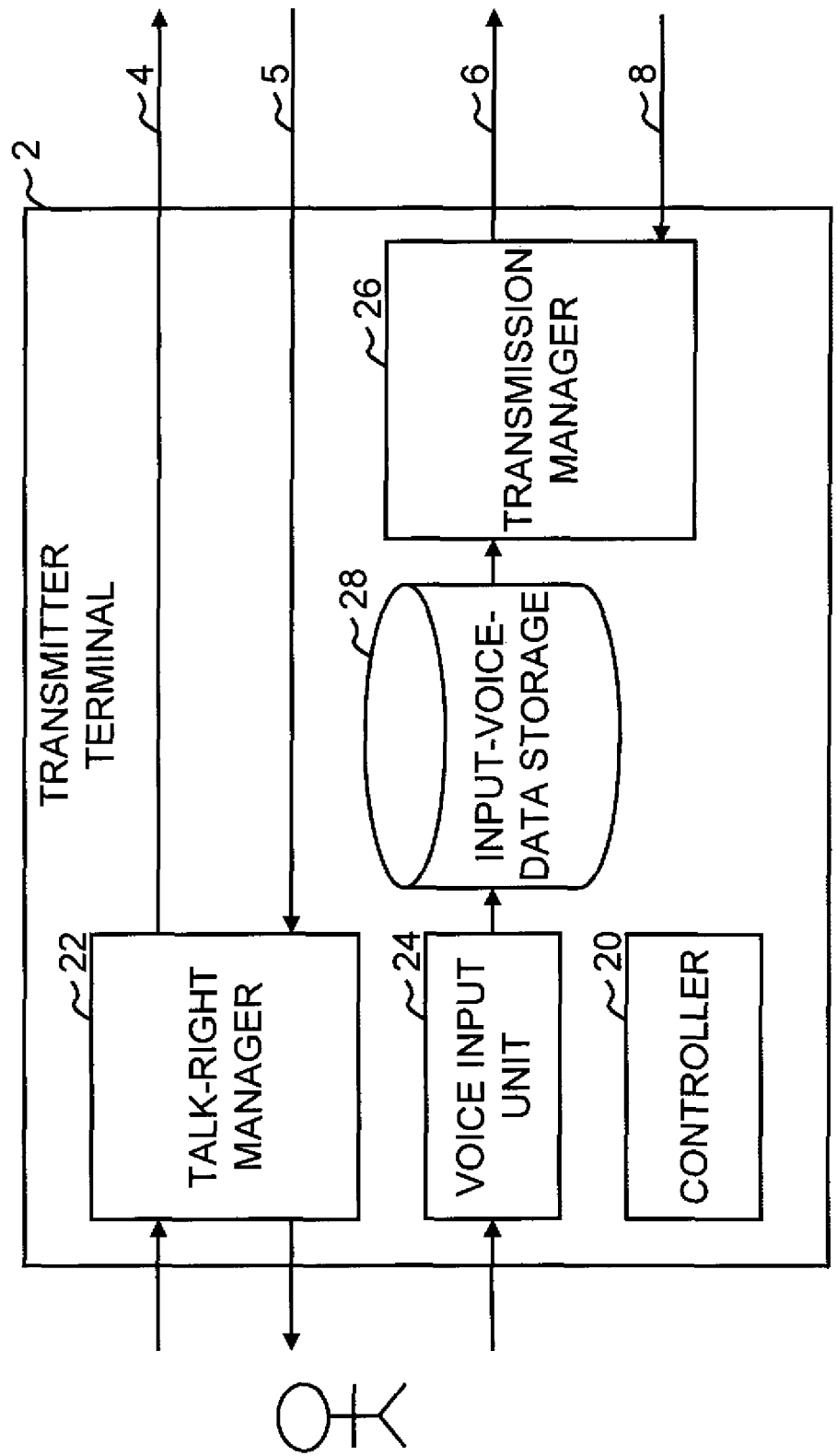
FIG. 3 is a diagram showing a system configuration of the transmitter terminal according to the embodiment of the present invention.

FIG. 3 is a diagram showing a system configuration of the transmitter terminal 2 according to the embodiment of the present invention. The transmitter terminal 2 according to the present embodiment includes a talk-right manager 22 for managing a talk right, a voice input unit 24 for accepting input of voice by users, a transmission-process manager 26 for managing voice-packet transmission process, an input-voice storage 28 for accumulating input voice data, and a controller 20 for controlling the entire process flow of the transmitter terminal 2. In addition, the controller 20 performs all of functions of a normal transmitter terminal. In response to pushing down of a talk-right request button by a user, the talk-right manager 22 transmits the talk-right request 4 to the PoC server 1, receives the talk-right information 5 transmitted from the PoC server 1, and displays information regarding the talk right on a display screen of the transmitter terminal 2. The voice input unit 24 accumulates voice data obtained by encoding a voice signal input from a microphone, in the input-voice storage 28 The transmission-process manager 26 determines the next transmission interval of the voice packet 6 on the basis of the determination information 8 notified from the PoC server 1, reads out the voice data in a size dependent on the determined transmission interval from the input-voice storage 28, generates the voice packet 6 containing the voice data, and transmits the voice packet 6 to the PoC server 1.

Figure 4:
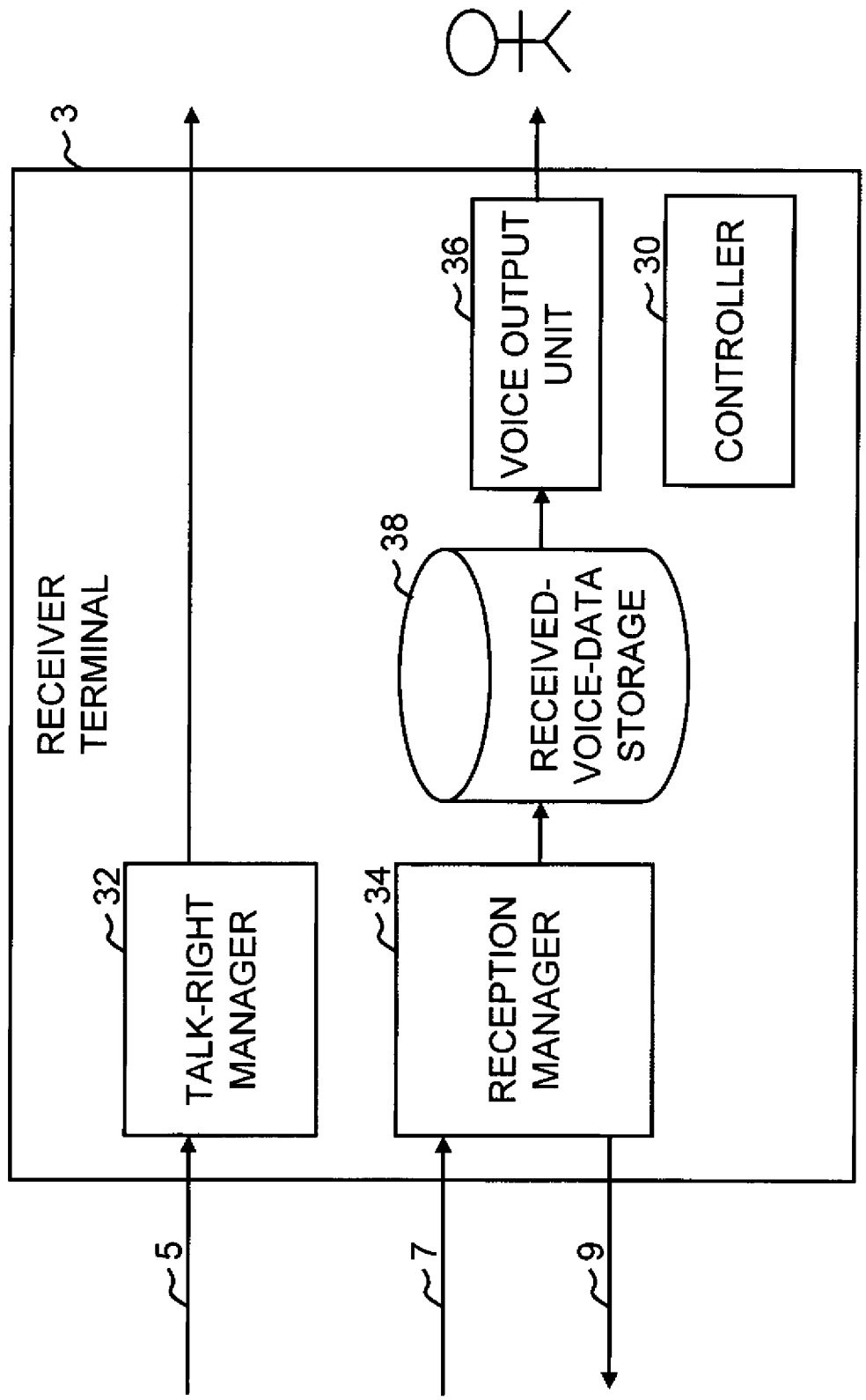
FIG. 4 is a diagram showing a system configuration of the receiver terminal according to the embodiment of the present invention.

FIG. 4 is a diagram showing a system configuration of the receiver terminal 3 according to the embodiment of the present invention. The receiver terminal 3 according to the present embodiment includes a talk-right manager 32 for managing a talk right, a reception-process manager 34 for managing voice-packet reception process, a voice output unit 36 for outputting voice to a loudspeaker, a received-voice-data storage 38 for accumulating voice data contained in the received voice packet 7, and a controller 30 for controlling the entire process flow of the receiver terminal 3. In addition, the controller 30 performs all of functions of a normal receiver terminal. The talk-right manager 32 receives the talk-right information 5 transmitted from the PoC server 1, and displays information regarding the talk right on a display screen of the receiver terminal 3. The reception-process manager 34 writes the voice data contained in the received voice packet 7 in the received-voice-data storage 38, and notifies the PoC server 1 of the determination information 9. The voice output unit 36 outputs, to a loudspeaker, a voice signal obtained by decoding the voice data read out from the received-voice-data storage 38.

Figure 5:
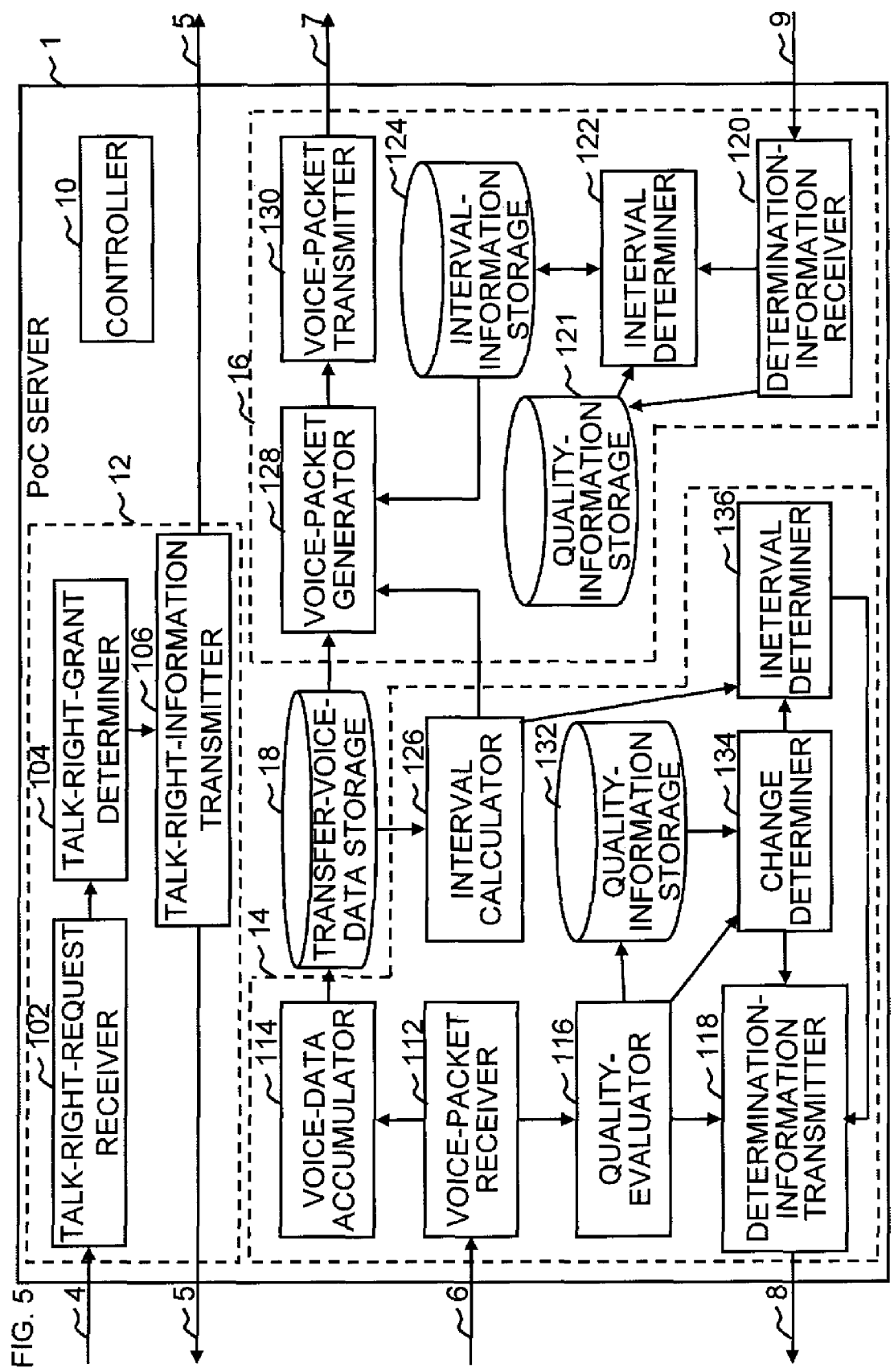
FIG. 5 is a diagram showing details of a system configuration of the PoC server according to the embodiment of the present invention.

FIG. 5 is a diagram showing details of a system configuration of the PoC server 1 according to the embodiment of the present invention. In this description, the description is given while assuming that quality information is transmitted as the determination information 8 (9). The talk-right manager 12 includes a talk-right-request receiver 102, a talk-right-grant determiner 104, and a talk-right-information transmitter 106. The talk-right-request receiver 102 receives the talk-right request 4 transmitted from the transmitter terminal 2. The talk-right-grant determiner 104 determines grant of a talk right. The talk-right-information transmitter 106 then notifies the transmitter terminal 2 and the receiver terminal 3 of the talk-right information 5. The reception-process manager 14 includes a voice-packet receiver 112, a voice-data accumulator 114, a quality evaluator 116, a determination-information transmitter 118, an interval calculator 126, a quality-information storage 132, a change determiner 134, and an interval determiner 136. The voice-packet receiver 112 receives the voice packet 6 transmitted from the transmitter terminal 2. The voice-data accumulator 114 writes the voice data contained in the received voice packet 6 in the transfer-voice-data storage 18. The voice-data accumulator 114 also writes the received voice packet 6 itself in the transfer-voice-data storage 18. The quality evaluator 116 evaluates quality of communication at the time that the voice-packet receiver 112 received the voice packet 6 to generate quality information. The interval calculator 126 calculates the transmission interval of the received voice packet. 6. The quality-information storage 132 stores quality information generated by the quality evaluator 116. The change determiner 134 determines increase or decrease in the transmission interval on the basis of the quality information generated by the quality evaluator 116 and the quality information stored in the quality-information storage 132. The interval determiner 136 determines a next transmission interval on the basis of the transmission interval calculated by the interval calculator 126 and the increase or decrease determined by the change determiner 134. The determination-information transmitter 118 notifies the transmitter terminal 2 of the quality information, the increase or decrease, or the next transmission interval as the determination information 8. The transmission-process manager 16 includes a determination-information receiver 120, a quality-information storage 121, an interval determiner 122, an interval-information storage 124, a voice-packet generator 128, and a voice-packet transmitter 130. The determination-information receiver 120 receives the quality information notified from the receiver terminal 3 as the determination information 9, and accumulates the quality information in the quality-information storage 121. The interval determiner 122 determines the next transmission interval of the voice packet 7 on the basis of the quality information notified from the receiver terminal 3, the previous quality information stored in the quality-information storage 121, and the current interval information stored in the interval-information storage 124. The interval determiner 122 updates the current interval information stored in the interval-information storage 124. On the other hand, the interval calculator 126 calculates the transmission interval of the received voice packet 6. If the transmission interval of the received voice packet 6 and the determined transmission interval of the voice packet 7 differ, the voice-packet generator 128 reads out the voice data in a size dependent on the determined transmission interval of the voice packet 7 from the transfer-voice-data storage 18, and generates the voice packet 7 by attaching a header to the voice data. If the transmission interval of the received voice packet 6 and the determined transmission interval of the voice packet 7 are the same, the voice-packet generator 128 reads out the received voice packet 6 from the transfer-voice-data storage 18, and generates the voice packet 7 by rewriting header information. The voice-packet transmitter 130 transmits the voice packet 7 to the receiver terminal 3.

Figure 6:
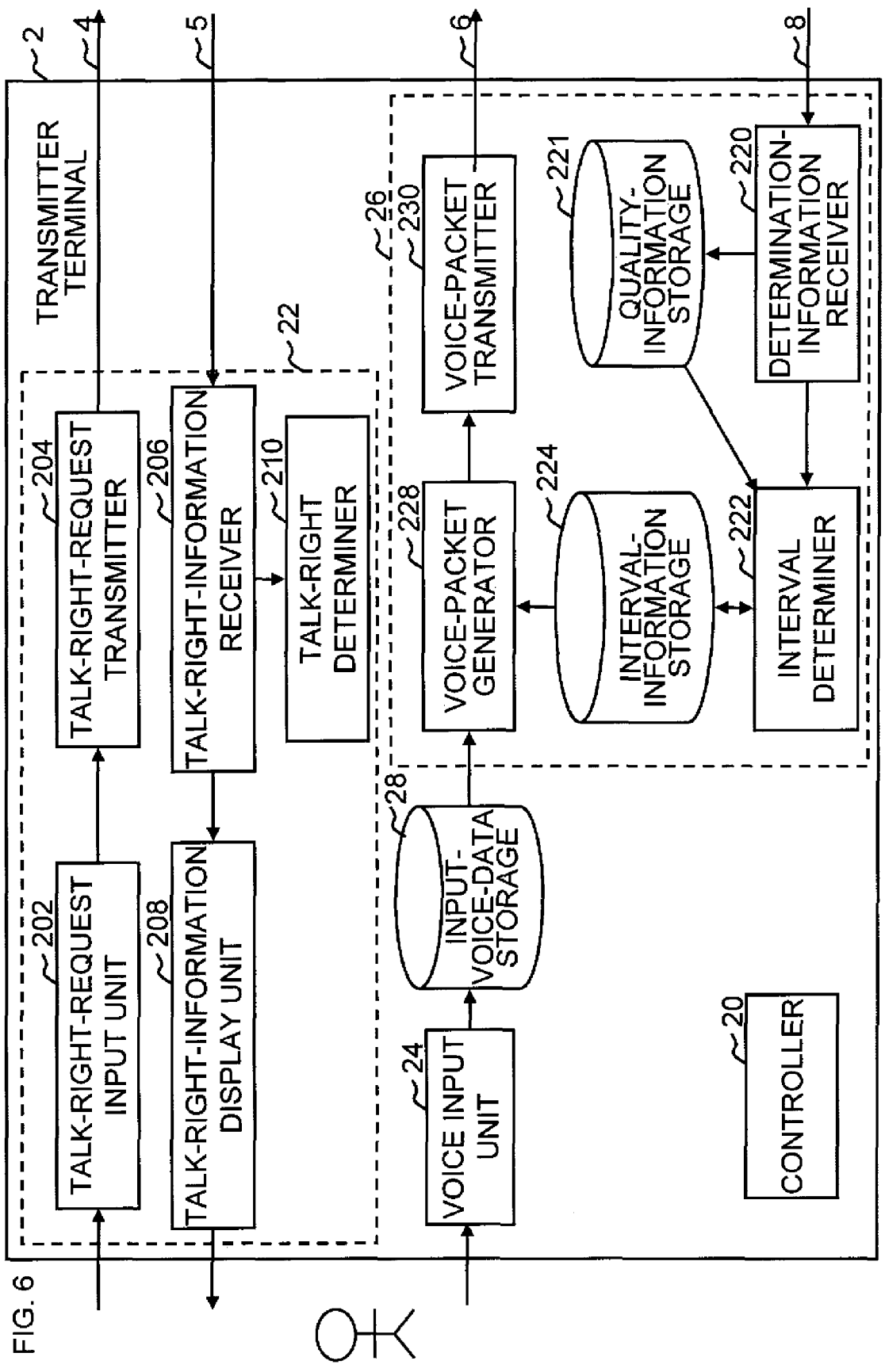
FIG. 6 is a diagram showing details of a system configuration of the transmitter terminal according to the embodiment of the present invention.

FIG. 6 is a diagram showing details of a system configuration of the transmitter terminal 2 according to the embodiment of the present invention. The talk-right manager 22 includes a talk-right-request input unit 202, a talk-right-request transmitter 204, a talk-right-information receiver 206, a talk-right-information display unit 208, and a talk-right determiner 210. The talk-right-request input unit 202 detects pushing down of a talk-right request button by a user. The talk-right-request transmitter 204 transmits the talk-right request 4 to the PoC server 1. The talk-right-information receiver 206 receives the talk-right information 5 transmitted from the PoC server 1. The talk-right-information display unit 208 displays information regarding the talk right on a display screen of the transmitter terminal 2. The talk-right determiner 210 determines an owner of the talk right to confirm that the transmitter terminal itself is the owner of the talk right. The transmission-process manager 26 includes a determination-information receiver 220, a quality-information storage 221, an interval determiner 222, an interval-information storage 224, a voice-packet generator 228, and a voice-packet transmitter 230. The determination-information receiver 220 receives the quality information notified from the PoC server 1 as the determination information 8, and accumulates the quality information in the quality-information storage 221. The interval determiner 222 determines the next transmission interval of the voice packet 6 on the basis of the quality information notified from the PoC server 1, the previous quality information accumulated in the quality-information storage 221, and the current interval information stored in the interval-information storage 224. The interval determiner 222 updates the current interval information stored in the interval-information storage 224. The voice-packet generator 228 reads out the voice data in a size dependent on the determined transmission interval of the voice packet 6 from the input-voice storage 28, and generates the voice packet 6 by adding a header to the voice data. The voice-packet transmitter 230 transmits the voice packet 6 to the PoC server 1.

Figure 7:
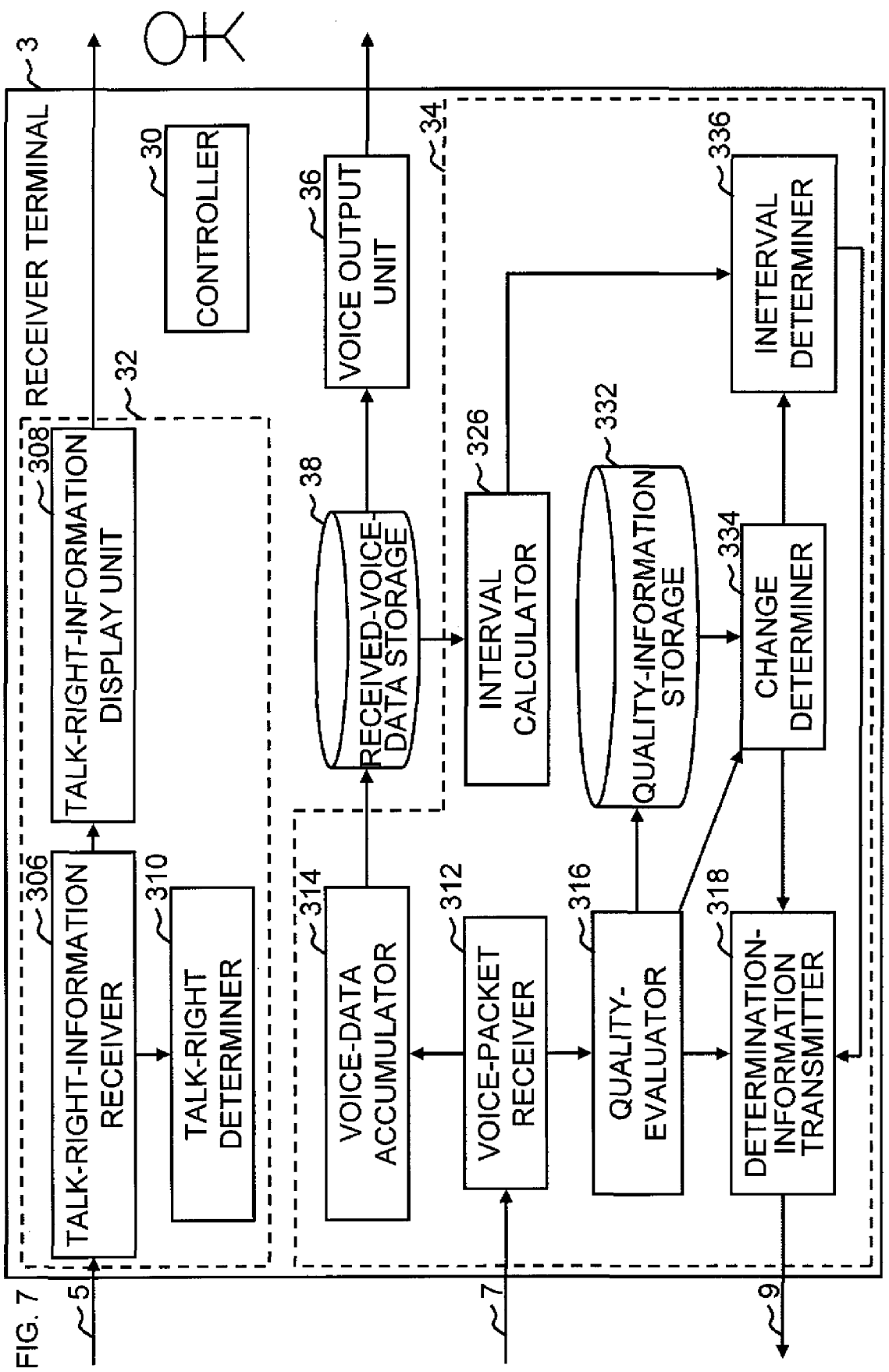
FIG. 7 is a diagram showing details of a system configuration of the receiver terminal according to the embodiment of the present invention.

FIG. 7 is a diagram showing details of a system configuration of the receiver terminal 3 according to the embodiment of the present invention. The talk-right manager 32 includes a talk-right-information receiver 306, a talk-right-information display unit 308, and a talk-right determiner 310. The talk-right-information receiver 306 receives the talk-right information 5 transmitted from the PoC server 1. The talk-right-information display unit 308 displays information regarding the talk right on a display screen of the receiver terminal 3. The talk-right determiner 310 determines an owner of the talk right to confirm that other party is the owner of the talk right. The reception-process manager 34 includes a voice-packet receiver 312, a voice-data accumulator 314, a quality evaluator 316, a determination-information transmitter 318, an interval calculator 326, a quality-information storage 332, a change determiner 334, and an interval determiner 336. The voice-packet receiver 312 receives the voice packet 7 transmitted from the PoC server 1. The voice-data accumulator 314 writes the voice data contained in the received voice packet 7 in the received-voice-data storage 38. The quality evaluator 316 evaluates quality of communication at the time that the voice-packet receiver 312 received the voice packet 7 to generate quality information. The interval calculator 326 calculates the transmission interval of the received voice packet 7. The quality-information storage 332 stores quality information generated by the quality evaluator 316. The change determiner 334 determines increase or decrease in the transmission interval on the basis of the quality information generated by the quality evaluator 316 and the quality information stored in the quality-information storage 332. The interval determiner 336 determines a next transmission interval on the basis of the transmission interval calculated by the interval calculator 326 and the increase or decrease determined by the change determiner 334. The determination-information transmitter 318 notifies the PoC server 1 of the quality information, the increase or decrease, or the next transmission interval as the determination information 9.

In the following, the embodiments will be described on the basis of a concrete case.

Figure 8:
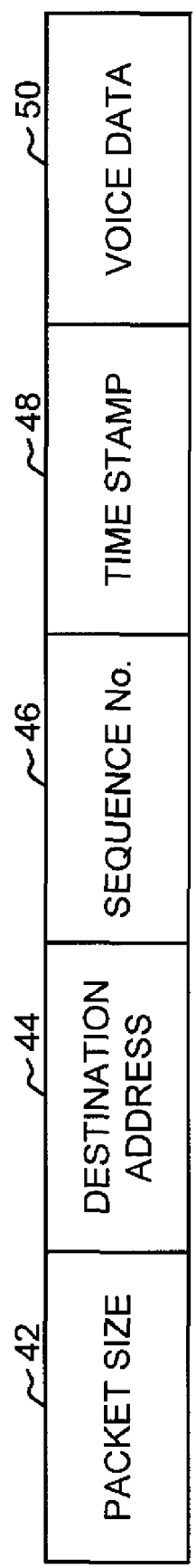
FIG. 8 is a diagram showing a data structure of the voice packet according to the embodiment of the present invention.

FIG. 8 is a diagram showing a data structure of the voice packet 6 according to the embodiment of the present invention. The voice packet 6 contains a packet size 42, a destination address 44, a sequence number 46, a time stamp 48, and voice data 50. The packet size 42 is a numerical value indicating the entire data length of the voice packet 6. The destination address 44 is an address indicating a transmission destination of the voice packet 6. The sequence number 46 is a numerical value indicating a transmission order of the voice packet 6. The time stamp 48 is a numerical value indicating transmission time of the voice packet 6. The voice data 50 is data obtained by encoding a voice signal to be transmitted. The size of the encoded data may differ depending on an encoding method, even if time lengths of voice signals are the same.

A voice signal is encoded into voice data every 20 milliseconds. Several of voice data corresponding to a voice signal for 20 milliseconds are collected in the voice data 50. For example, when the transmission interval is set to 40 milliseconds, two of the voice data are collected. Accordingly, a voice signal for 40 milliseconds is transmitted in one packet.

A plurality of call terminals can be connected to the PoC server 1. A call terminal among the plurality of call terminals that acquired a talk right serves as the transmitter terminal 2, and transmits the voice packet 6, whereas the other call terminals serve as the receiver terminals 3, and receive the voice packet 7. The PoC server 1 stores, in the interval-information storage 124, the transmission interval for each call terminal serving as the receiver terminal 3. FIG. 9 is a diagram showing a data structure of the interval information to be stored in the interval-information storage 124 according to the embodiment of the present invention. In an example shown in FIG. 9, the PoC server 1 is set to transmit the voice packet 7 at a transmission interval of 80 milliseconds when transmitting the packet to a call terminal A, at a transmission interval of 40 milliseconds when transmitting the packet to a call terminal B, and at a transmission interval of 60 milliseconds when transmitting the packet to a call terminal C. Each call terminal stores a transmission interval for transmitting the voice packet 6 to the PoC server 1 when serving as the transmitter terminal 2.

Figure 10:
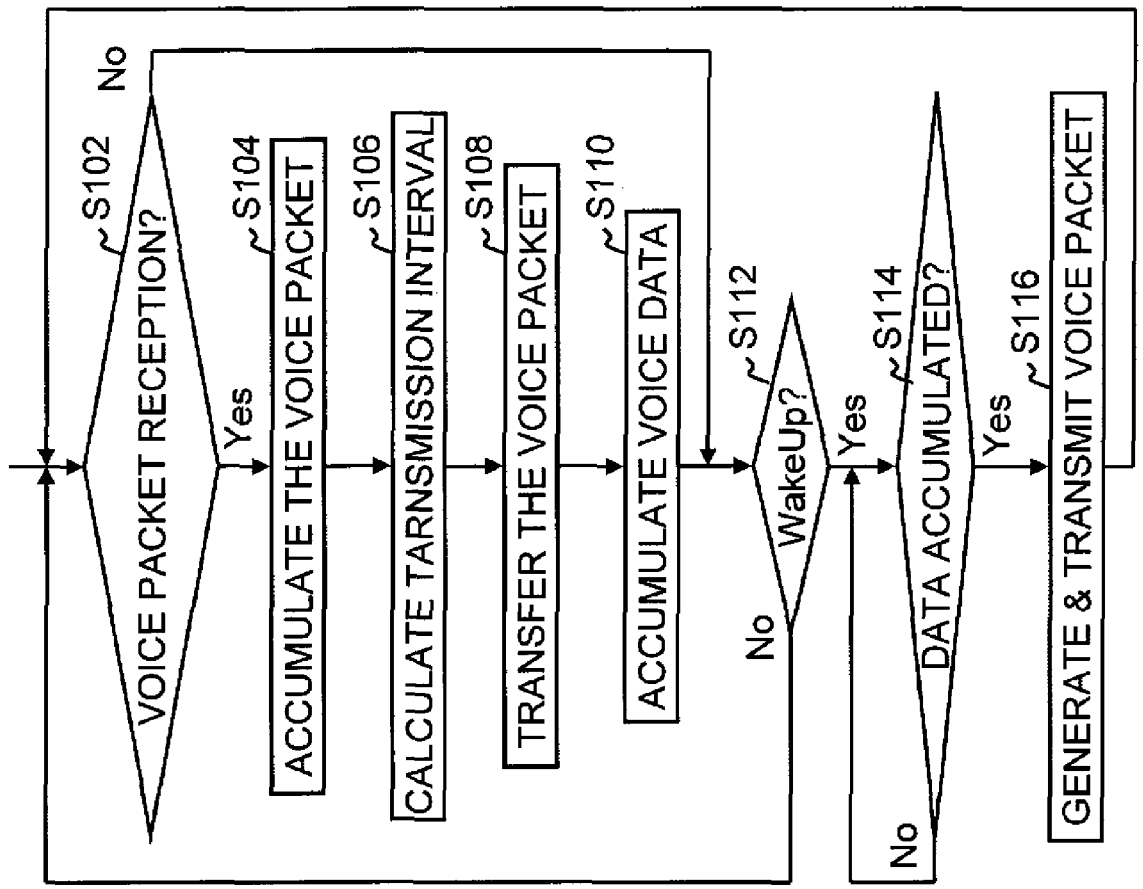
FIG. 10 is a flowchart of the PoC server in voice packet transfer according to the embodiment of the present invention.

FIG. 10 is a flowchart of the PoC server 1 in voice packet transfer according to the embodiment of the present invention. A process flow of the PoC server 1 in voice packet transfer will be described in the order of step S102 to step S116. In the present embodiment, it is assumed that the voice packet 7 for each transmission interval is generated and transmitted at the transmission interval in synchronization with a WakeUp signal output every 20 milliseconds.

(Step S102) The voice-packet receiver 112 receives the voice packet 6 transmitted from the transmitter terminal 2.

(Step S104) The voice-data accumulator 114 writes the received voice packet 6 in the transfer-voice-data storage 18.

(Step S106) The interval calculator 126 calculates the transmission interval of the received voice packet 6. A method for calculating the transmission interval of the voice packet 6 may be any method. For example, the transmission interval can be calculated, utilizing the sequence number 46 and the time stamp 48 of the voice packet 6, by calculating a difference in time stamp 48 between the received voice packet 6 and the voice packet 6 having a sequence number 46 less than the received voice packet 6 by one. Alternatively, information indicating the packet contains the voice data corresponding to a voice signal of how many milliseconds may be added to the header. In addition, if the size of the encoded data is proportional to the length of the voice signal, the transmission interval can be calculated by checking the data size of the voice data 50.

(Step S108) The voice-packet generator 128 checks the interval-information storage 124 to extract the receiver terminal 3 for which the same transmission interval as that of the received voice packet 6 is set. If the receiver terminal 3, for which the same transmission interval as that of the received voice packet 6 is set, exists, the voice-packet generator 128 reads out the received voice packet 6 from the transfer-voice-data storage 18, rewrites the destination address 44 to the address of the corresponding receiver terminal 3 to generate the voice packet 7. The voice-packet transmitter 130 transmits the voice packet 7. For example, in case that the transmission interval of the received voice packet 6 is 40 milliseconds, as the transmission interval set for the receiver terminal B is also 40 millisecond, the destination address 44 of the received voice packet 6 is rewritten to the address of the receiver terminal B to generate the voice packet 7. This voice packet 7 is then transmitted. In this way, the voice packet 7 is transmitted to all of receiver terminals 3 for which the same transmission interval as that of the received voice packet 6 is set. With this configuration, it is possible to transmit the voice packet 7 faster without requiring time for generation of the packet.

(Step S110) The voice-data accumulator 114 reads out the received voice packet 6 from the transfer-voice-data storage 18, extracts only the voice data, and writes the voice data in the transfer-voice-data storage 18.

(Step S112) The WakeUp signal is output every 20 milliseconds.

(Step S114) In response to output of the WakeUp signal (Step S112: Yes), regarding the transmission interval corresponding to the transmission timing, the voice-packet generator 128 checks whether the next voice data corresponding to this transmission interval is accumulated in the transfer-voice-data storage 18.

(Step S116) If the next voice data is accumulated in the transfer-voice-data storage 18 (Step S114: Yes), the voice-packet generator 128 reads out the next voice data from the transfer-voice-data storage 18, and generates the voice packet 7 in which the address of the receiver terminal 3, for which this transmission interval is set, is set at the destination address 44. The voice-packet transmitter 130 transmits the voice packet 7.

As described above, according to the present embodiment, it is possible to transmit the voice packet 7 at a different transmission interval for each receiver terminal 3 without stopping the transmission of the voice packet 7.

In the present embodiment, the transmission interval of the voice packet 7 is changed on the basis of the evaluation of the communication quality. The scale for evaluating the communication quality may be any scale. As an example, a packet-loss rate and jitter will be described.

Figure 11:
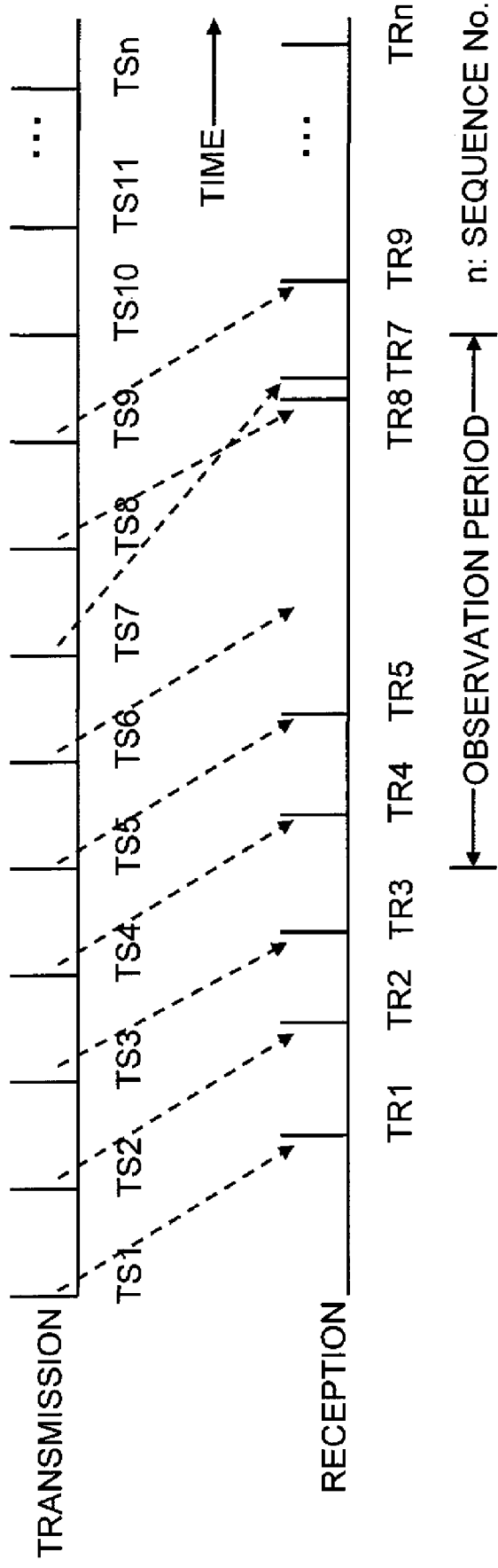
FIG. 11 is a diagram illustrating definitions of a packet-loss rate and a jitter value according to the embodiment of the present invention.

FIG. 11 is a diagram illustrating definitions of a packet-loss rate and a Jitter value according to the embodiment of the present invention. The time at which a packet with a sequence number n is transmitted is denoted by TSn. Similarly, the time at which the packet with the sequence number n is received is denoted by TRn. The packet transmitted at the time TSn is received at the time TRn.

Sequence numbers of received packets during a predetermined observation period are checked to extract the minimum sequence number and the maximum sequence number. In the example of FIG. 11, the minimum sequence number is 4, whereas the maximum sequence number is 8. Accordingly, it is expected that five packets from 4 to 8 can be received during this period. In fact, a packet with the sequence number 6 is not received. Thus, it is considered that the packet with the sequence number 6 could not be received (which is referred to as packet loss). Since one out of five packets could not be received, the packet-loss rate is equal to 20%. The definition of the packet-loss rate is not limited to the one shown in FIG. 11, and may be any definition as long as it can evaluate the degree of the packet loss.

The time required for transfer, from transmission of a packet to reception of the packet, changes in accordance with a condition of a network or the like. Thus, the time required for transfer of a packet that was received at one time differs from the time required for transfer of a packet that was received immediately before the packet. Such a fluctuation in the time required for transfer is referred to as jitter. A jitter value is defined to evaluate the degree of jitter. For example, in FIG. 11, the jitter value is defined as an average-like value of differences between the times required for transfer of adjacent packets in a reception order, and is evaluated each time the packet is received. In the definition of jitter m in FIG. 11, m does not represent the sequence number but represents the reception order of the received packet. TRm denotes a reception time of the m-th received packet, whereas TSm denotes a transmission time of the m-th received packet. Definition of the jitter value is not limited to the one shown in FIG. 11, and may be any definition as long as it can evaluate the degree of the jitter.

Such evaluation of the communication quality may be performed all the time, or may be performed appropriately. For example, the PoC server 1 performs the evaluation of the communication quality only when it grants a talk right to the transmitter terminal 2. Additionally, the receiver terminal 3 performs the evaluation of the communication quality only when the talk right is granted to the transmitter terminal 2. With such a configuration, unnecessary processing can be reduced.

A process for changing a transmission interval of the voice packet 7 on the basis of the evaluation of the communication quality will be described next.

Figure 12:
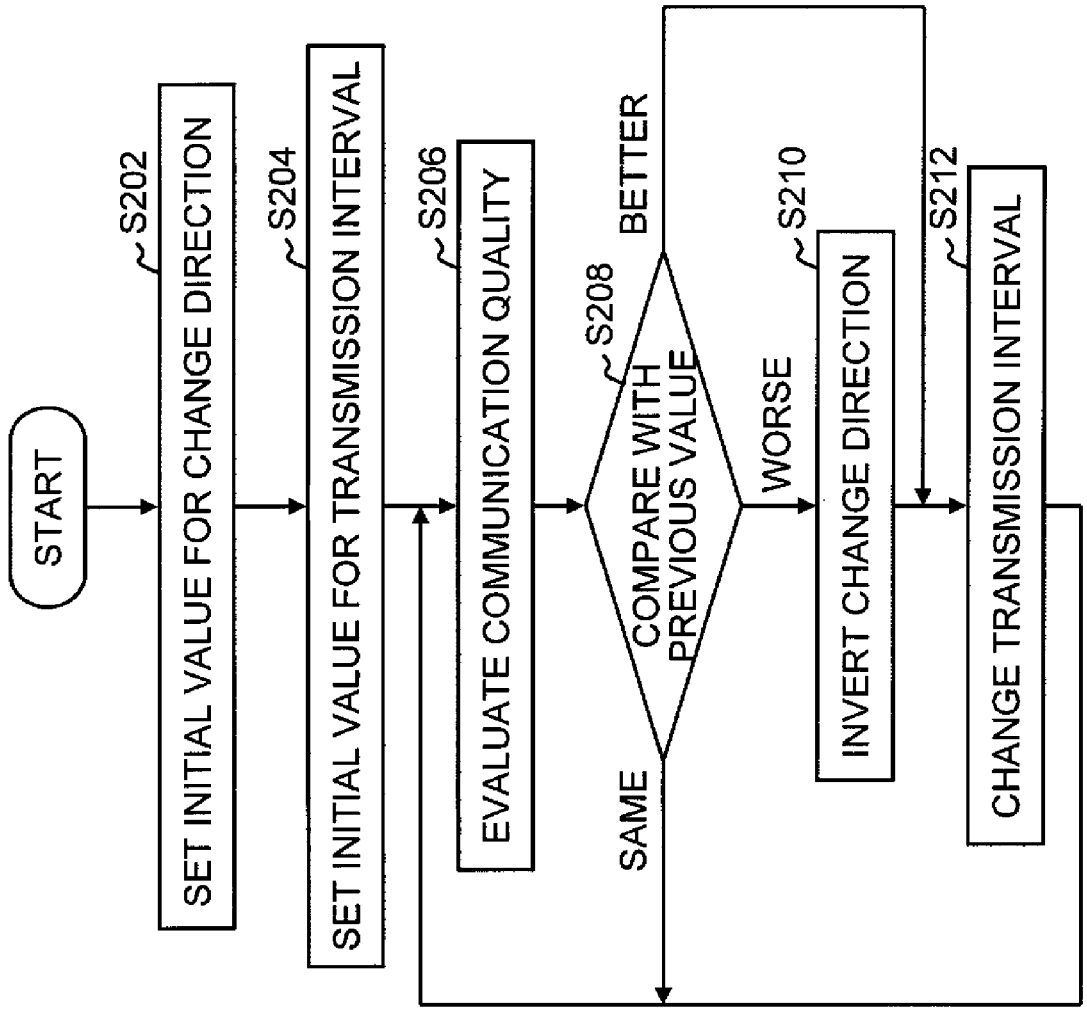
FIG. 12 is a flowchart of an interval change process according to the embodiment of the present invention.

FIG. 12 is a flowchart of an interval change process according to the embodiment of the present invention. A flow of the interval change process will be described in the order of step S202 to step S212. Additionally, it is assumed that the transmission interval is set to an integral multiple of a basic unit (for example, 20 milliseconds).

(Step S202) An initial value for a change direction that indicates shortening or extending the transmission interval is set. The change direction is either "extending" or "shortening". The initial value for the change direction can be set freely. For example, the initial value for the change direction is set as "extending".

(Step S204) An initial value of the transmission interval is set. The initial value of the transmission interval can be set to any value For example, the initial value of the transmission interval is set as "100 milliseconds".

(Step S206) After the start of reception, the communication quality is evaluated every predetermined period (for example, five seconds). The above-described packet-loss rate or jitter value is used as a scale of evaluation. In case that the packet-loss rate is used as the evaluation scale, the packet-loss rate for the predetermined period is calculated, and the communication quality is evaluated by this value. In case that the jitter value is used as the evaluation scale, the jitter value is calculated every reception of a packet. The communication quality is evaluated by the jitter value that was calculated last during the predetermined period. The communication quality may be evaluated by a combination of the packet-loss rate and the jitter value. The way of combining the packet-loss rate and the jitter value is arbitrary. For example, the communication quality is evaluated using a weighted sum of the packet-loss rate and the jitter value.

(Step S208) The evaluated value obtained at step S206 is compared with the previously evaluated value to determine whether the evaluated value gets better than the previous time, gets worse than the previous time, or is the same as the previous time. At this time, a threshold used for the determination is preset. If the difference between the evaluated values is within the threshold, the evaluated value is determined to be the same as the previous time. If the difference between the evaluated values exceeds the threshold, the evaluated value is determined to get worse than the previous time or get better than the previous time. A ratio of the difference to the previously evaluated value may be compared with the threshold instead of the difference. If the evaluated value is determined to be the same as the previously evaluated value, changing of the transmission interval is not performed, and the process proceeds to step S206. If the evaluated value is determined to get worse than the previously evaluated value, the process proceeds to step S210. If the evaluated value is determined to get better than the previously evaluated value, the process proceeds to step S212.

(Step S210) Prior to changing of the transmission interval, inversion of the change direction is performed. More specifically, if the current change direction is set to "extending", the direction is set to "shortening", whereas, if the current change direction is set to "shortening", the direction is set to "extending".

(Step S212) The current transmission interval is changed by the basic unit in the change direction. For example, in case that the current transmission interval is 100 milliseconds and the current change direction is "extending", the transmission interval is changed to 120 milliseconds. In case that the current transmission interval is 100 milliseconds and the current change direction is "shortening", the transmission interval is changed to 80 milliseconds. After the change, the process proceeds to step S206.

As described above, according to the present embodiment, it is possible to change the transmission interval of the PoC server 1 on the basis of the receiver terminal 3. In the above description, changing of the transmission interval has been described while assuming the voice-packet transmission from the PoC server 1 to the receiver terminal 3. However, the same applies to changing of the transmission interval in the voice-packet transmission from the transmitter terminal 2 to the PoC server 1.

Various variations can be considered for the transmission interval changing method.

In the above description, the transmission interval is determined on the transmission side on the basis of quality information evaluated on the reception side to reduce the load of the reception side. There may be a case where the transmission interval receivable by the reception side is limited depending on a system condition of the reception side. In such a case, the reception side may notify the transmission side of a range of receivable transmission intervals beforehand, and the transmission side may determine the transmission interval within the range. By this, it is possible to prevent the voice packets from being transmitted at a transmission interval that is not receivable by the reception side.

In addition, the reception side may determine the transmission interval, and may instruct the transmission side to transmit packets at that transmission interval. This can reduce the load of the transmission side. In such a case, the transmission interval transmittable by the transmission side may be limited depending on a system condition of the transmission side. If the transmission side cannot transmit packets at the transmission interval specified by the reception side, the transmission side may deny changing of the transmission interval to that transmission interval. In addition, the transmission side may notify the reception side of the denial of changing of the transmission interval. In such a way, it is possible to match the transmission interval assumed by the reception side and the actual transmission interval. Alternatively, the transmission side may notify the reception side of a range of the transmittable transmission interval, and the reception side may determine the transmission interval within the range. In this way, the reception side can determine the transmission interval in an appropriate range.

In addition, the reception side may determine increase or decrease in the transmission interval, and may notify the transmission side of the increase or decrease. On the basis of this, the transmission side may determine the transmission interval. In this way, the load of both of the transmission side and the reception side can be reduced to some extent.

Furthermore, the reception side may specify the time point at which changing of the transmission interval specified by the reception side is executed, by, for example, specifying the sequence number of the transmitted packet. By this, it is possible to match the transmission interval assumed by the reception side and the actual transmission interval.

Each device according to the above-described embodiments can be carried out not only as hardware but also as computer software. For example, programs causing a computer to execute the talk-right manager 12, the reception-process manager 14, the transmission-process manager 16, and the controller 10 shown in FIG. 2 are created, and the programs are loaded on a memory of the computer and are executed, thereby realizing the PoC server 1.

Figure 13:
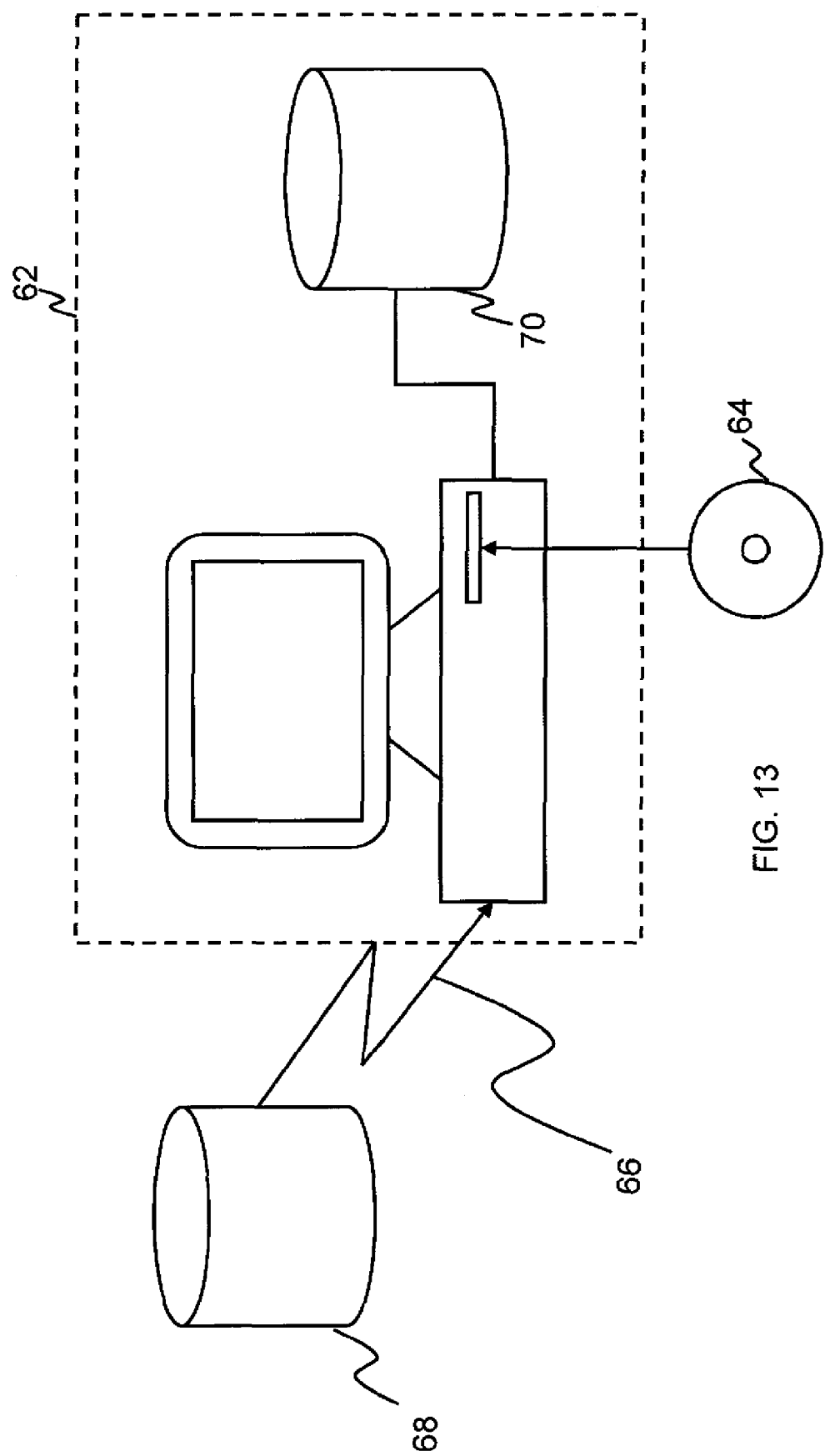
FIG. 13 is a diagram showing an example of a computer environment.

As shown in FIG. 13, the programs that realize each device according to the embodiments of the present invention may be those stored on not only a portable recording medium 64, such as a CD-ROM, a CD-RW, a DVD-R, a DVD-RAM, a DVD-RW, and a flexible disk, but also another storage device 68 provided at the end of a communication line 66, a storage device or a recording medium 70, such as a hard disk or a RAM of a computer system 62. At the time of execution of the programs, the programs are loaded, and executed on a main memory.

In the above embodiments, the present invention has been described as the PoC system. However, the techniques according to the present invention can be applied not only to the PoC system but also to call systems constituted by a call server that manages voice sessions and call terminals that attend the sessions. More specifically, the call server gives the call-terminals feedback of information for determining the transmission interval at the time of reception of the voice packet 6 from a call terminal serving as the transmitter terminal 2, thereby changing the voice-packet transmission interval in the call terminal. A call terminal serving as the receiver terminals 3 gives the call server feedback of information for determining the transmission interval at the time of reception of the voice packet 7 from the call server, thereby changing the voice-packet transmission interval in the call server. The call server removes the header information from the received voice packet 6, and accumulates only the voice data in the transfer-voice-data storage 18. When the call server transmits the voice packet 7, the call server reads out an amount of voice data corresponding to the transmission interval from the transfer-voice-data storage 18, attaches header information to the voice data to generate the voice packet 7, and transmits the voice packet 7. The call server may accumulate the received voice packet 6 as it is in the transfer-voice-data storage 18. When the call server transfers the packet at the same transmission interval as that of the received voice packet 6, the call server reads out the voice packet 6 from the transfer-voice-data storage 18, changes the header information to generate the voice packet 7, and transmits the voice packet.

In the above embodiments, the data included in the packet has been described as voice data. However, any data, i.e. image data, can be included in the packet and transmitted with the techniques according to the present invention.

We also disclose:
a communication system comprising
  a server, and
  a plurality of terminals capable of communicating with the server, said terminal including:
    an input unit for
      receiving an input signal input by a user, and
      converting the input signal into first communication data,
    a determination-information receiver for receiving first determination information from the server,
    an interval determiner for determining a first transmission interval on the basis of the first determination information,
    a packet generator for generating a first sequence of packets on the basis of the first communication data and the first transmission interval,
    a packet transmitter for transmitting the first sequence of packets to the server at the first transmission interval,
    a communication-information receiver for receiving a second sequence of packets from the server, said second sequence of packets containing second communication data,
    an output unit for
      converting the second communication data into an output signal, and outputting the output signal, and
    a determination-information transmitter for transmitting second determination information to the server, said second determination information being generated on the basis of the second sequence of packets in order to determine a second transmission interval, the server transmitting the second sequence of packets at said second transmission interval,
  said server including:
    a reception manager for
      receiving the first sequence of packets from a first terminal,
      generating the first determination information on the basis of the first sequence of packets, and
      transmitting the first determination information to the first terminal, and
    a transmission manager for
      receiving the second determination information from a second terminal,
      determining the second transmission interval for the second terminal on the basis of the second determination information received from the second terminal,
      generating the second sequence of packets for the second terminal containing the second communication data, and
      transmitting to the second terminal the second sequence of packets generated for the second terminal at the second transmission interval determined for the second terminal,
wherein the transmission manager generates the second sequence of packets on the basis of the second transmission interval determined for each of a plurality of second terminals connected to the server,
wherein the transmission manager transmits each second sequence of packets at the each second transmission interval determined for the each second terminal, and
a transfer processing method executed by a server for performing a transfer process, said server being capable of communicating with a plurality of terminals, said server including an interval-information storage for storing a second transmission interval determined for each terminal, said transfer processing method comprising the steps of:
receiving a first sequence of packets from a first terminal, said first sequence of packets containing communication data,
calculating a first transmission interval of the first sequence of packets,
transmitting the first sequence of packets to a same-interval terminal at the first transmission interval after rewriting a destination address of the first sequence of packets, said same-interval terminal being other than the first terminal, the second transmission interval determined for said same-interval terminal coinciding with the first transmission interval, said destination address being an address of the same-interval terminal,
extracting the communication data from the first sequence of packets,
generating a second sequence of packets on the basis of the communication data and the second transmission interval for a different-interval terminal, said different-interval terminal being other than the first terminal, the second transmission interval determined for said different-interval terminal being different from the first transmission interval, and
transmitting to the different-interval terminal the second sequence of packets generated for the different-interval terminal at the second transmission interval determined for the different-interval terminal.

What is claimed is:
1. A server capable of communicating with a plurality of terminals, comprising:
a reception manager including:
a packet receiver for receiving from a first terminal a first sequence of packets containing communication data, the first sequence of packets being transmitted with a first transmission interval between adjacent packets; and
a transmission manager including:
a packet generator for
generating a second sequence of packets for each of a plurality of second terminals connected to the server on the basis of a second transmission interval individually determined for the each second terminal, the second transmission interval being different from the first transmission interval, the second sequence of packets containing the communication data derived from the first sequence of packets, and
a packet transmitter for
transmitting the each second sequence of packets with a corresponding second transmission interval between adjacent packets.
2. The server of claim 1,
the transmission manager further including:
a determination-information receiver for receiving determination information from the each second terminal; and
an interval determiner for determining the second transmission interval on the basis of the determination information,
the packet generator generating the second sequence of packets on the basis of the second transmission interval determined by the interval determiner and the communication data.
3. The server of claim 2,
the determination information containing interval specification information specifying an updated value of the second transmission interval,
the interval determiner updating the second transmission interval in accordance with the updated value.
4. The server of claim 2,
the determination information containing interval change information specifying an increase or a decrease in the second transmission interval,
the interval determiner updating the second transmission interval on the basis of the interval change information.
5. The server of claim 2, further comprising:
a quality-information storage for storing quality information indicating quality of communication,
the determination information containing the quality information,
the interval determiner updating the second transmission interval on the basis of the quality information stored in the quality-information storage and the quality information contained in the determination information received by the determination-information receiver, and a current second transmission interval,
the quality information contained in the determination information received from the second terminal being stored in the quality-information storage after the update of the second transmission interval.
6. The server of claim 1,
the reception manager further including:
a determination-information transmitter for transmitting determination information to the first terminal, the determination information being generated on the basis of the first sequence of packets in order to determine a first transmission interval, the first terminal transmitting the first sequence of packets with the first transmission interval between adjacent packets.
7. The server of claim 6,
the reception manager further including:
a quality evaluator for
evaluating quality of communication at a time of receiving the first sequence of packets, and
generating quality information indicating the quality of communication,
the determination information containing the quality information.
8. The server of claim 6, further comprising:
a quality-information storage for storing quality information indicating quality of communication at a time of receiving the first sequence of packets,
the reception manager further including:
a quality evaluator for
evaluating the quality of communication, and
generating the quality information, and
a change determiner for generating interval change information by comparing the quality information stored in the quality-information storage with the quality information generated by the quality evaluator, the interval change information specifying an increase or a decrease in the first transmission interval, the quality information generated by the quality evaluator being stored in the quality-information storage after the comparison, the determination information containing the interval change information.

9. The server of claim 6, further comprising:

a quality-information storage for storing quality information indicating quality of communication at a time of receiving the first sequence of packets, the reception manager further including:

a quality evaluator for evaluating the quality of communication, and generating the quality information, a change determiner for generating interval change information by comparing the quality information stored in the quality-information storage with the quality information generated by the quality evaluator, the interval change information specifying an increase or a decrease in the first transmission interval, the quality information generated by the quality evaluator being stored in the quality-information storage after the comparison, an interval calculator for calculating the first transmission interval at the time of receiving the first sequence of packets, and an interval specification generator for generating interval specification information on the basis of the interval change information and the first transmission interval calculated by the interval calculator, the interval specification information specifying an updated value of the first transmission interval, the determination information containing the interval specification information.

\* \* \* \* \*